US010664399B2

(12) United States Patent
Persson et al.

(10) Patent No.: US 10,664,399 B2
(45) Date of Patent: May 26, 2020

(54) FILTERING COHERENCY PROTOCOL TRANSACTIONS

(71) Applicant: ARM Limited, Cambridge (GB)

(72) Inventors: Håkan Lars-Göran Persson, Lund (SE); Ian Rudolf Bratt, San Jose, CA (US); Andrew Brookfield Swaine, Sheffield (GB); Bruce James Mathewson, Cambridge (GB)

(73) Assignee: ARM Limited, Cambridge (GB)

(*) Notice: Subject to any disclaimer, the term of this patent is extended or adjusted under 35 U.S.C. 154(b) by 0 days.

(21) Appl. No.: 15/825,633

(22) Filed: Nov. 29, 2017

(65) Prior Publication Data

US 2018/0157590 A1    Jun. 7, 2018

(30) Foreign Application Priority Data

Dec. 2, 2016  (GB) .................................. 1620464.6

(51) Int. Cl.
*G06F 12/0831* (2016.01)
*G06F 13/16* (2006.01)

(52) U.S. Cl.
CPC ...... *G06F 12/0833* (2013.01); *G06F 13/1668* (2013.01); *G06F 2212/621* (2013.01)

(58) Field of Classification Search
CPC ............. G06F 12/0833; G06F 13/1668; G06F 2212/621
See application file for complete search history.

(56) References Cited

U.S. PATENT DOCUMENTS

| 6,332,165 B1* | 12/2001 | Hagersten ........... G06F 11/0712 709/200 |
| 2002/0083275 A1 | 6/2002 | Kawamoto et al. |
| 2010/0332771 A1* | 12/2010 | Gray .................. G06F 12/0831 711/148 |
| 2016/0070658 A1* | 3/2016 | Woolley ............. G06F 12/1458 711/130 |

OTHER PUBLICATIONS

Search and Examination Report for GB1620464.6, dated May 11, 2017, 6 pages.

* cited by examiner

*Primary Examiner* — David Yi
*Assistant Examiner* — Dustin B. Fulford
(74) *Attorney, Agent, or Firm* — Nixon & Vanderhye P.C.

(57) ABSTRACT

A filter comprises interface circuitry, to intercept coherency protocol transactions exchanged between a master device comprising a first cache and an interconnect for managing coherency between the first cache and at least one other cache or other master device. The filter has filtering circuitry for filtering the coherency protocol transactions in dependence on memory access permission data defining which regions of an address space the master device is allowed to access.

25 Claims, 6 Drawing Sheets

FILTERING COHERENCY PROTOCOL TRANSACTIONS

This application claims priority to GB Patent Application No. 1620464.6 filed 2 Dec. 2016, the entire contents of which is hereby incorporated by reference.

The present technique relates to the field of data processing. More particularly, it relates to cache coherency.

A data processing system may include a number of master devices with local caches for caching data from a memory system. A coherent interconnect may be provided to manage coherency between the data in the caches using coherency protocol transactions defined according to a particular coherency protocol.

At least some examples provide a filter unit comprising:
interface circuitry to intercept coherency protocol transactions exchanged between a master device comprising a first cache and an interconnect for managing coherency between said first cache and at least one other cache or other master device; and
filtering circuitry to filter the coherency protocol transactions in dependence on memory access permission data defining which regions of an address space the master device is allowed to access.

At least some examples provide an apparatus comprising:
a master device comprising a first cache;
an interconnect to manage coherency between said first cache and at least one other cache or other master device using coherency protocol transactions exchanged between the master device and the interconnect; and
the filter unit as described above.

At least some examples provide a filter unit comprising:
means for intercepting coherency protocol transactions exchanged between a master device comprising a first cache and an interconnect for managing coherency between said first cache and at least one other cache or other master device; and
means for filtering coherency protocol transactions in dependence on memory access permission data defining which regions of an address space the master device is allowed to access.

At least some examples provide a data processing method comprising:
intercepting coherency protocol transactions exchanged between a master device comprising a first cache and an interconnect for managing coherency between said first cache and at least one other cache or other master device; and
filtering the coherency protocol transactions in dependence on memory access permission data defining which regions of an address space the master device is allowed to access.

FIG. 1 schematically illustrates an example of data processing system including a number of master devices and a coherent interconnect;

FIG. 2 schematically illustrates a filter unit for filtering coherency protocol transactions intercepted between the interconnect and a master device;

Figure 1:
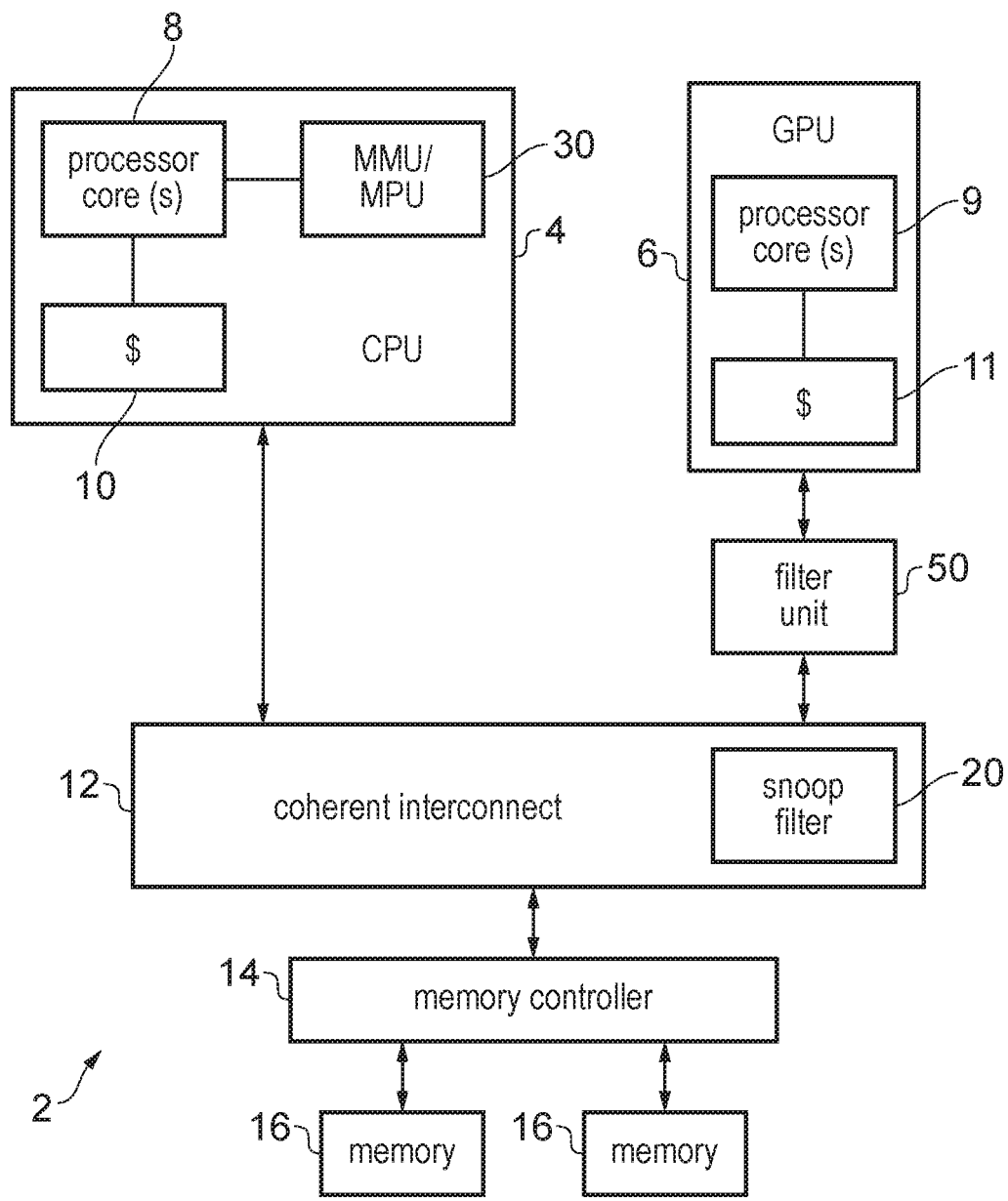

FIG. 1 schematically illustrates an example of a data processing system 2 comprising a number of master devices 4, 6. In this example the masters include a central processing unit (CPU) 4 and a graphics processing unit (GPU) 6. The CPU 4 and GPU 6 each have one or more processor cores 8, 9 and at least one cache 10, 11 for storing data for access by the processor cores 8, 9. For a master including a cluster of two or more processor cores, each of the cores may have a separate cache, as well as one or more shared levels of cache being provided for the cluster of cores as a whole. Hence, the cache 10, 11 illustrated in each master device 4, 6 of FIG. 1 is merely an example of a cache within the master, and it will be appreciated that in practice there may be more than one cache provided.

A coherent interconnect 12 is provided for maintaining coherency between data in the respective caches 10, 11 of the masters 4, 6. The interconnect can also maintain coherency between data in a given cache 10, 11 and data used by another master which may not necessarily have its own cache (e.g. an uncached master such as an I/O controller). The interconnect 12 is coupled to the masters 4, 6 as well as to at least one slave device, such as a memory controller 14 for controlling access to main memory 16. The coherent interconnect 12 operates according to a particular coherency protocol which governs the form of the coherency transactions exchanged between the interconnect 12 and the respective masters 4, 6 and the behaviour of the interconnect 12 and the masters 4, 6 when a particular type of coherency protocol transaction is received. An example of a coherency protocol is the AMBA® 4 ACE coherency protocol provided by ARM® Ltd of Cambridge, UK, but it will be appreciated that other coherency protocols could also be used.

The coherency protocol may allow data to be cached in one of the caches 10, 11 in one of a number of coherency states. For example, data may be in either a non-shareable state or a shareable state. For data cached in a given master in the non-shareable state, the interconnect 12 is not required to maintain coherency with other masters, and the master 4, 6 caching the data is free to modify the data without checking for coherency with data in other masters. On the other hand, for data cached in a given master in the shareable state, the interconnect 12 is required to maintain coherency with other masters. Whether a given address is shareable or non-shareable may be set (e.g. per address region) based on configuration information stored in a memory protection unit or memory management unit.

Non-shareable data can be either held in a dirty state, indicating that the data needs to be written back to a further cache or main memory on invalidation from the cache 10, 11, or a clean state, indicating that no write back is required on invalidation. Shareable data can also be held in a clean or dirty state. In addition, for shareable data, the data can be held in a modifiable (Unique) state, in which the master holding the cached data is allowed to read or update the cached data without communication with the interconnect 12, or a non-modifiable (Shared) state, in which communication with the interconnect 12 is required on a write to the shared data (reads to the shared data can still be allowed without communicating with the interconnect 12). Different combinations of modifiable/non-modifiable (Unique/

Shared) and clean/dirty can also be defined as respective coherency states—e.g. in the AMBA® 4 ACE protocol data may be held as SharedClean, SharedDirty, UniqueClean or UniqueDirty. Note that the fact that data is cached in the Shared state does not necessarily imply that another cache definitely holds data from the same address—it just indicates that it is possible that another cache could have the data. On writing data cached in the shared state, a coherency protocol transaction is sent by the master device 4, 6 to the interconnect 12, which may then send coherency protocol transactions to other masters to check whether they are holding more up to date versions of the data or need to have their copy of the data updated in view of the change made in the first master, for example. It will be appreciated that different coherency protocols may define different sets of coherency states, and the above examples are not the only kinds of coherency state that could be defined in the protocol.

For conciseness, FIG. 1 shows an example with just two masters, each of which has its own cache 10, 11. However, it will be appreciated that the coherency protocol may be scalable to any number of masters. For example, other masters may include display controllers for controlling display of graphics data on a display device, input/output controllers for controlling transfer of data to or from a peripheral device, and so on. Some masters may be uncached masters which do not include an internal cache. Coherency may still need to be maintained with such masters, e.g. to ensure data written out to a peripheral device is consistent with the latest data held by one of the caches 10, 11.

As shown in FIG. 1, the coherent interconnect 12 may include a snoop filter 20 for tracking which data addresses are cached at certain master devices 4, 6. The snoop filter 20 is not essential, and some embodiments may provide an interconnect 12 which does not attempt to track the data cached at each master. In this case, when one master 4, 6 issues a read or write transaction to data which could be shared with other masters, the coherent interconnect 12 may trigger snoop transactions to be issued to each other master which could have a cached copy of the data from the same address, and manage changes in coherency state at those other masters and/or responses to the initiating master with more up to date versions of the data as necessary. However, if there are a lot of masters, then this approach of broadcasting snoops to all cached masters can be complex and result in a large volume of coherency traffic being exchanged within the system 2.

By providing a snoop filter 20 which can at least partially track which addresses are cached at the respective masters, this can help to reduce the volume of snoop traffic. In some cases the snoop filter 20 may precisely track the data stored in each master's cache, so that the coherent interconnect 12 can determine exactly which data is cached where. Hence, when a transaction is received from an initiating master directed to potentially shareable data then the interconnect 12 can determine from the content of the snoop filter 20 which other masters are caching data from the same address and send snoop transactions to those masters indicated in the snoop filter, avoiding the need to send snoops to other masters which are not currently storing the data.

However, other snoop filters may not track the content of the caches precisely. For example, a scheme may be used which ensures that the snoop filter 20 avoids false negatives, ensuring that any data which is present in the caches 10, 11 is logged as present in the snoop filter, but which permits some false positives, so that sometimes the snoop filter 20 may indicate that data is cached in a given master, but actually the master has already invalidated the data. This approach of allowing some imprecision can reduce the overhead of updating the snoop filter as it means that not every invalidation from the master's cache 10, 11 has to be reflected at the snoop filter.

Either way, the snoop filter 20 can be used to reduce snoop traffic by allowing the coherent interconnect 12 to determine when data is not cached at a particular master. Note that the snoop filter 20 is different to the filter unit described below, in that it filters coherency protocol transactions in dependence on an indication of whether a particular master currently holds cached data for a given address, rather than filtering based on memory access permission data defining whether a master is allowed to access data from a given address. The filtering by the snoop filter 20 may be independent of memory access permission data.

For some use cases, it may be desirable to provide the ability to protect certain data from being accessed by certain master devices 4, 6. For example, for content protection purposes, while one master may be allowed to access copyright-protected digital content, it may be desirable to prevent other non-protected masters from being able to access the protected data (e.g. because the non-protected masters are executing untrusted software drivers). Hence, different masters within the same system may have different needs for access rights and restrictions to certain portions of the memory address space.

As shown in the CPU 4 of FIG. 1, one approach for implementing such memory access permissions may be to provide a memory protection unit (MPU) or memory management unit (MMU) 30 within the master device 4 itself, for determining whether read or write transactions issued by the processor core 8 to its local cache 10 are allowed. An MPU may store a table with each entry of the table corresponding to a given region of the memory address space and containing access permission data defining whether the master is permitted to read or write data from that region of the address space, without any address translation functionality. An MMU is similar to the MPU in implementing the memory protection functionality, but also provides address translation (e.g. between virtual addresses generated by the processor core 8 and physical addresses used by the memory system). For example, the MMU may have a similar access permission table to the MPU, but each entry may in addition specify the translated address to which the virtual address supplied by the processor core 8 should be translated, with the translated address then being supplied to the cache 10 for identifying the required data.

In a master comprising an MPU or MMU 30, when the load/store queue of the processor core 8 triggers a read operation or write operation to read/write data from the local cache 10, the address of the read/write is looked up in the MPU or MMU 30, which checks whether the operation is allowed given the defined access permissions for that address (and an address translation is also performed in the case of the MMU). If a memory access violation is detected, then this may trigger a memory fault, while otherwise the transaction is allowed to proceed, triggering a cache lookup in the cache 10, which could itself then trigger a coherency protocol transaction to be sent to the interconnect 12 depending on the coherency state of the cached data.

However, the operation of the MMU or MPU 30 within the CPU 4 is independent of the coherency protocol managed by the coherent interconnect 12. The coherency protocol transactions exchanged between the CPU 4 and the interconnect 12 would not be checked against the access permissions defined in the MMU or MPU 30. While it is possible that coherency operations performed by the interconnect 12 could lead to data from a given address being stored in the CPU's cache 10 when the CPU is in fact not allowed to access that address, merely caching protected data in the CPU's cache 10 is not in itself a problem, as the MMU/MPU 30 would prevent the CPU 4 reading/writing the protected data if the core 8 tries to issue a subsequent read/write to the protected address.

However, not all masters may have an MMU or MPU 30 for implementing memory protection. For example, the GPU 6 in the example of FIG. 1 does not have an MMU or MPU 30. In many cases, the design, testing and verification cost and effort required in adapting an existing master device design to include an MMU or MPU 30 may be prohibitive, and therefore this may prevent such masters being used in environments where protected data is to be processed. Limiting the choice of master designs therefore affects the flexibility with which a system for processing protected content can be designed (which may prevent other desirable features of certain master designs not having an MMU or MPU being adopted).

The present technique provides a filter unit 50 for intercepting coherency protocol transactions which are exchanged between a cached master 6 and a coherent interconnect 12, and filtering the intercepted transactions in dependence on memory access permission data defining whether the master device is allowed to access certain memory address regions. For example, the filter unit 50 can block coherency protocol transactions passing between the cached master 6 and the coherency interconnect 12 if they do not meet the memory access permissions defined for that particular master.

This approach is counter-intuitive, since the logical place to implement memory access protection would be within the master itself rather than as part of the coherency traffic. The volume of coherency traffic passing between a given master 6 and the interconnect 12 is typically higher than the volume of reads or write operations exchanged between that master's processor core 9 and cache 11, because the coherency traffic includes not only transactions triggered by the master's own reads/writes, but also transactions triggered by activity in other masters. Hence, filtering coherency protocol transactions based on memory permission data between the interconnect 12 and the master 6 would require a greater volume of lookups in a memory permission table than if the memory protection functionality is implemented between the processor core 8 and the cache 10 as for the CPU 4 shown in FIG. 1. Also, the filtering provided by the filtering unit 50 may reduce the flexibility available for handling certain shareable coherency states within the coherency protocol. If a master has no read or write permission to a given address region, then this may limit the extent to which that master can share data in a coherent manner with other masters, which may have a knock on effect on performance if more data transactions have to be serviced by a further cache or main memory 16 beyond the point of coherency rather than being serviceable in the local caches of those masters. However, the inventors of the present technique recognize that despite these points, it can still be advantageous to filter coherent protocol transactions between the master 6 and the interconnect 12 based on memory access permission data, because this allows a master device designed without a MMU or MPU to be used in an environment in which protected content is to be processed, to reduce overall system development costs.

While FIG. 1 shows an example where just the GPU 6 has the filter unit 50, in systems having multiple masters, any cached master may be provided with a corresponding filter unit 50 defining the memory access permissions for that master and implementing filtering of coherency protocol transactions based on those access permissions. Nevertheless, the system may also include some masters such as the CPU 4 which have their own MMU or MPU 30, and for such masters no filter unit 50 is required. Also, while FIG. 1 shows the filter unit 50 as distinct from the interconnect 12, in other examples the filter unit 50 could be implemented as functionality within the interconnect 12 itself.

Figure 2:
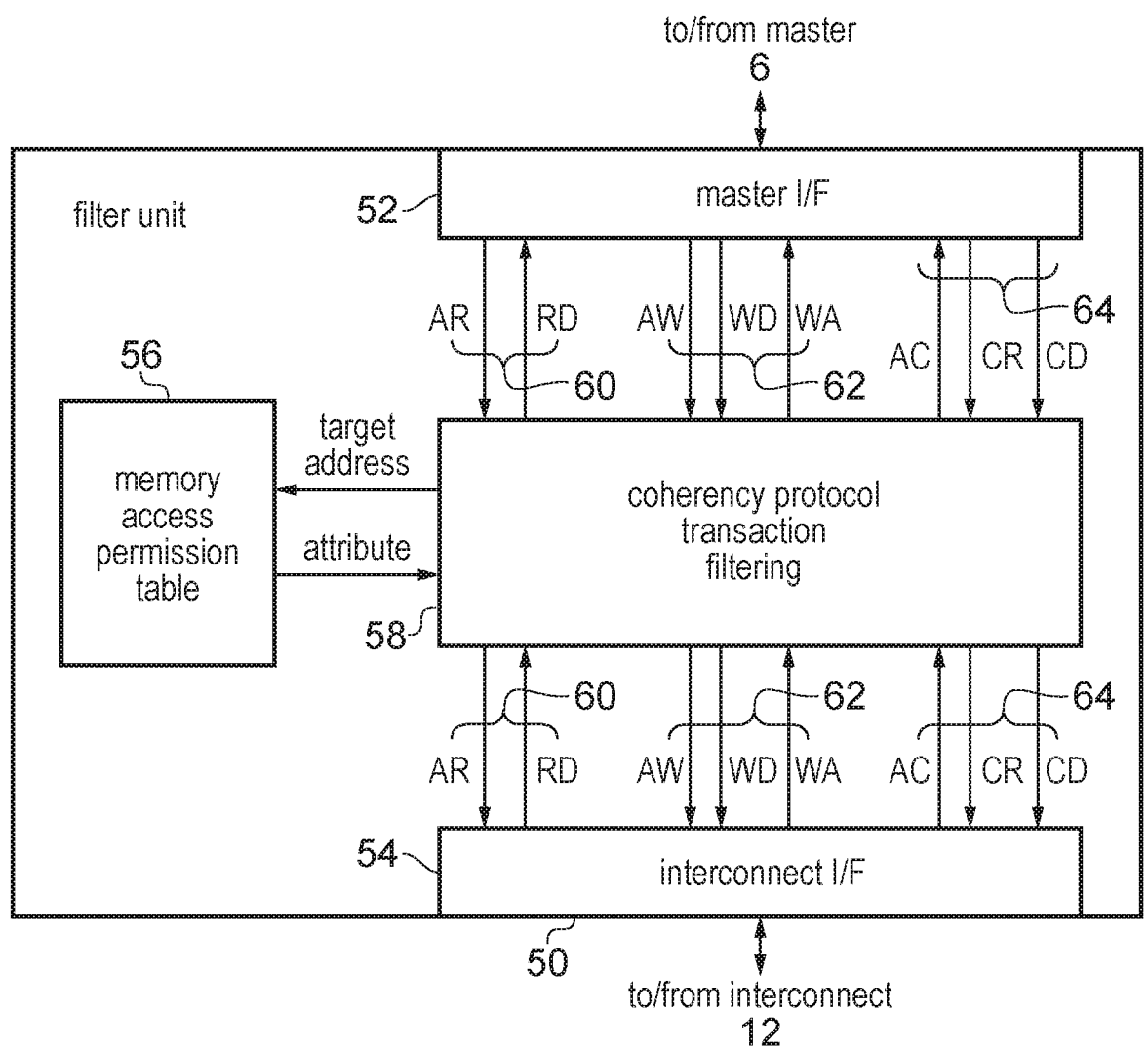

FIG. 2 shows an example of the filter unit 50 in more detail. The filter unit 50 comprises a master interface 52 for receiving coherency protocol transactions from a master device 6 and outputting coherency protocol transactions to the master 6, and an interconnect interface 54 for receiving coherency protocol transactions from the interconnect 12 and outputting coherency protocol transactions to the interconnect 12. The master interface 52 and interconnect interface 54 can collectively be considered to be interface circuitry for intercepting coherency protocol transactions exchanged between the master 6 and the interconnect 12.

The filter unit 50 also has a memory access permission table 56 which comprises a number of entries each providing memory access permission data for a corresponding block of memory addresses. For example, each entry in the table 56 may specify whether the master 6 is allowed to read data from the corresponding region of the address space or to write data to that region of the address space. Some implementations may use a two-level access control scheme, where each region is either accessible or inaccessible for both reads and writes (either no access or read/write access). Other implementations could also permit a read only mode, i.e. giving three levels of control to a given address (no access, read only access, or read/write access). However, for greatest flexibility, it can be useful to enforce read and write permissions separately, so that there are four possible levels of control for each address (no access, read only access, write only access, or read/write access). For example, this approach can be useful for dividing bus masters into protected or non-protected bus masters, with different needs for access rights and restrictions. Non-protected masters may require read-write access to non-protected memory regions. Some non-protected masters may additionally require write only access to certain memory regions (e.g. this could be useful for allowing a given master, such as the CPU 4, to overwrite subtitles over certain locations of a frame of protected video content even if the master providing the subtitles does not itself have access to the protected content). Protected masters may require read-write access to protected memory, and read-only access to non-protected memory. Clearly, other usage models for allocating particular combinations of read/write permissions to certain masters could also be supported.

While FIG. 2 shows an example where the permission table 56 is stored within the filter unit 50, other examples may store the memory access permission data outside the filter unit 50. For example, the permission data could be stored in external memory 16 as page table entries and read using a page table walk from external memory. While there may be a permission buffer for caching a number of recently accessed entries within the filter unit 50, the entries stored in the filter unit 50 may not cover the entire address space, and so on encountering an address which misses in the filter unit's local buffer, the required permission data may be fetched from memory 16. For conciseness the subsequent examples will refer to the permission table 56 within the filter unit 50, but it will be appreciated this is just one example of a possible configuration.

The filter unit 50 has filtering circuitry 58 for filtering the stream of coherency protocol transactions passing between the master interface 52 and the interconnect interface 54 based on the memory permission data defined in the memory access permission table 56. The filtering may include blocking certain transactions from reaching their destination, or modifying transactions which violate the access permissions to replace them with a different type of transaction which is permitted. In general, when a transaction is received at one of the master interface 52 and the interconnect interface 54, the filtering circuitry 58 looks up the target address of the transaction in the memory access permission table 56, and if there is a hit, controls how that transaction is handled based on the type of transaction and the memory access permissions specified in the table 56. If there is a miss in the table 56 then a default attribute can be used (e.g. the default could be that no access is allowed, or that both read/write access are allowed). Different rules may be defined for different types of transactions, indicating whether they are to be filtered for the different levels of memory protection. Various examples of such filtering rules are described below.

In general, the coherency protocol transactions may include several broad classes of transactions:

read transactions issued on a read channel 60 are issued by the master 6 to the interconnect 12 to read data from a given target address. The read channel 60 comprises a read request channel AR for transmitting a read request specifying the type of read and the target address of the data to be read, and a read data channel RD for returning the read data from the interconnect 12 to the master 6. The read data could have been returned from either a cache in another master or from memory 16. The read channel 60 can also be used for some snoop or cache maintenance transactions issued by the master 6 to query coherency state of data in other masters, or trigger coherency state transitions at other masters, even if the master 6 itself does not actually require the data value to be read.

write transactions issued on a write channel 62 are issued by a master 6 to update data associated with a given target address. The write channel 62 includes a write request channel AW for passing a write request specifying the type of write transaction and write target address to the interconnect 12, a write data channel WD for passing the data value to be written to the interconnect 12, and a write acknowledgement channel WA for returning a write acknowledgement to the master 6 to confirm that the write has been serviced.

snoop transactions issued by the interconnect 12 to the master 6 on a snoop channel 64 are used to query the coherency state of data cached in the cache 11 of the master 6. Such snoop transactions may be triggered by the interconnect 12 in response to reads and writes issued by other masters in the system. The snoop channel 64 includes a snoop request channel AC for providing a snoop request specifying the type of snoop and a snoop target address to the master 6, a snoop response channel CR returning from the master 6 to the interconnect 12 to provide an indication of the coherency state of the snooped data, and a snoop data channel CD passing from the master 6 to the interconnect 12 to provide a snooped data value to the interconnect, so that the interconnect 12 can pass the snooped data on to other masters if required.

In general, any of the types of coherency protocol transaction passing on any of the read, write and snoop channels 60, 62, 64 can be filtered by the filtering circuitry 58. In some embodiments, it may not be necessary to filter transactions on the snoop channel 64, while other embodiments may filter transactions on all of the channels.

Figure 3:
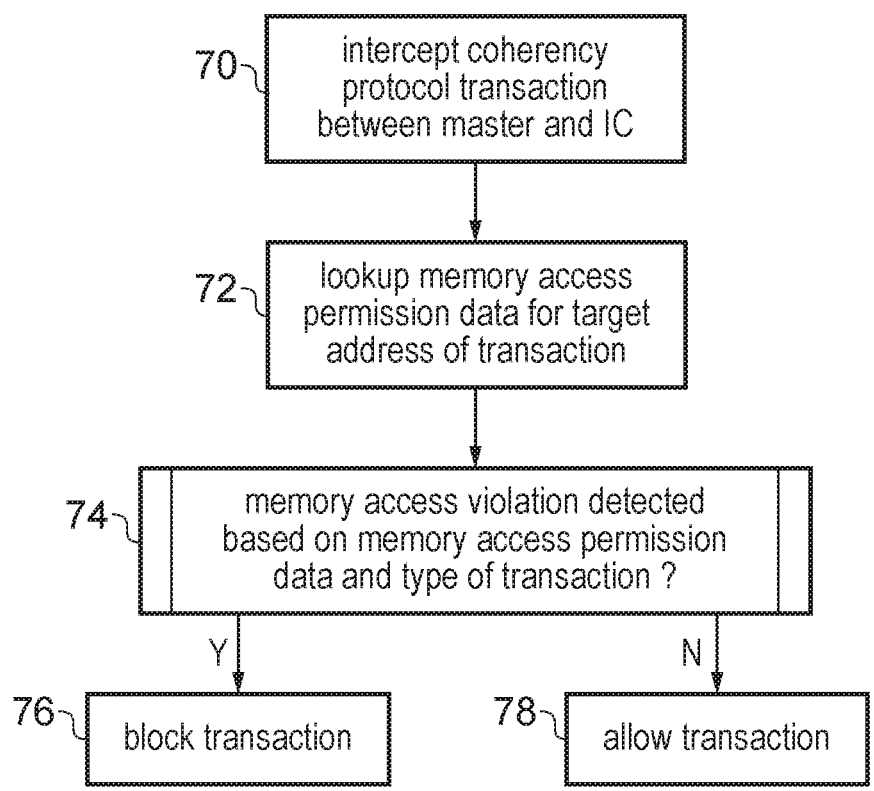
FIG. 3 is a flow diagram illustrating a method of filtering coherency protocol transactions.

FIG. 3 shows a flow diagram illustrating a method of filtering coherency protocol transactions. At step 70 the filter unit 50 intercepts a coherency protocol transaction exchanged between a master device 6 and the interconnect 12, which could be a read or write transaction passing from the master 6 to the interconnect 12 or a snoop transaction passing from the interconnect 12 to the master 6. At step 72 the filtering circuitry 58 looks up the access permission data for the target address of the transaction in the memory access permission table 56. At step 74 the filtering circuitry 58 determines, based on the looked up memory access permission data and the type of the transaction, whether a memory access violation is detected. Example criteria for determining whether a memory access violation is detected are described below with respect to FIGS. 4 and 5. If a memory access violation is detected, then at step 76 the coherency protocol transaction is blocked, while if no memory access violation is detected then at step 78 the transaction is allowed to proceed to its destination.

The blocking of transactions at step 76 can be performed in a number of ways. For outgoing coherency protocol transactions passing from the master 6 to the interconnect 12, the transactions can be blocked by triggering an error condition when a memory access permission valuation is detected. For example, a bus error can be signalled to the master 6, and the transaction is not forwarded to the interconnect 12. Another technique for blocking outgoing coherency protocol transactions can be to replace them with an alternative type of coherency protocol transaction which is allowed. These approaches have the advantage that the cache 11 in the master 6 and the snoop filter 20 can be kept consistent with each other, which can simplify management of the snoop filter 20. However, if snoop filter consistency is not required, another approach can be for the filter unit 50 to respond to blocked transactions with a response which appears to indicate that the transaction has been serviced as normal, but without passing the transaction onto the interconnect 12. For example, dummy data can be returned to the master device in response to a blocked read transaction (e.g. a value where all bits are 0), so that a master seeking to read data from an address for which it does not have read access simply receives a meaningless dummy value which obscures the real data. On the other hand, blocked write transactions may be acknowledged as normal, but have no effect (with the write data being discarded without being written to memory).

For incoming coherency protocol transactions on the snoop channel 64, there are also different ways of blocking transactions. Again, one approach can simply be to block the snoop and prevent it being passed to the master device 6. Another approach can be to replace the incoming snoop with an invalidating coherency protocol transaction which triggers invalidation from the cache 11 in the master 6 of any data associated with the target address specified by the incoming snoop. This approach may be preferred in order to ensure consistency between the master's cache 11 and the snoop filter 20. For both of these approaches, in response to a blocked snoop, a miss response may be returned to the interconnect indicating that the target address missed in the cache 11 of the master 6 (even if the master cache actually does contain the data).

In some examples the filter unit 50 may function similar to a memory protection unit (MPU) in that it defines access permissions but may not implement any form of address translation. Hence, the filtering circuitry 58 may look up the memory access permission data in dependence on a target address of a coherency protocol transaction received from one of the master device and the interconnect, and control issuing of a coherency protocol transaction specifying the same target address to the other of the master device and the interconnect in dependence on the looked up memory access permission data. That is, addresses leaving the filter unit 50 would be the same as the corresponding addresses arriving at the filter unit 50.

For other examples, the filter unit 50 may function similar to a memory management unit (MMU), in that it may also implement a layer of address translation at the same time as looking up the memory access permission data. Hence, the filtering circuitry 58 may look up the memory access permission data in dependence on a target address of a coherency protocol transaction received from one of the master device and the interconnect, map the target address to a translated address in dependence on address translation data, and control issuing of a coherency protocol transaction specifying the translated address to the other of the master device and the interconnect in dependence on the looked up memory access permission data. Hence, addresses leaving the filter unit 50 may be different to the corresponding addresses arriving at the filter unit 50. For example, each entry in the table 56 may, in addition to the memory access permissions, also specify data for mapping the incoming target address to an outgoing target address.

However, the filter unit 50 may differ from a typical MMU in that, in addition to the forward address mapping required for read or write transactions, it may also be required to perform the reverse address mapping for some snoop transactions which are travelling in the opposite direction, in order to map the address used by the memory system back to the corresponding address used to identify data in the cache 11 of the master 6. Some types of transactions may not lead to any snoops to the master's cache 11, e.g. transactions that do not result in any new cache line being allocated (e.g. WriteUnique or ReadOnce as discussed below), or transactions that result in a new cache line being allocated but in a state where the cache line cannot be snooped (e.g. ReadNoSnoop if snoops to non-shareable cache lines are ignored by the master device 6 as will be discussed further below). Such types of transactions may not require a reverse address mapping.

However, for other transactions a reverse address mapping may be required. In this case, to ensure that the reverse mapping can be performed, the filter unit 50 may use an address mapping that provides a one-to-one mapping between any given target address and the corresponding translated address. For example, the mapping applied may require that there is some uniform translation scheme for the entire address range (e.g. adding a fixed constant to the original address to obtain the target addresses). Alternatively, on setting the memory access permission data, when writing a new entry to the table, the filter unit may check whether the translated address specified in that entry is the same as any existing translated address in any of the entries already stored in the table, and if there is a match then the new entry may be rejected as invalid, to ensure that the overall address translation function continues to provide a one-to-one (bijective) mapping.

Figure 4:
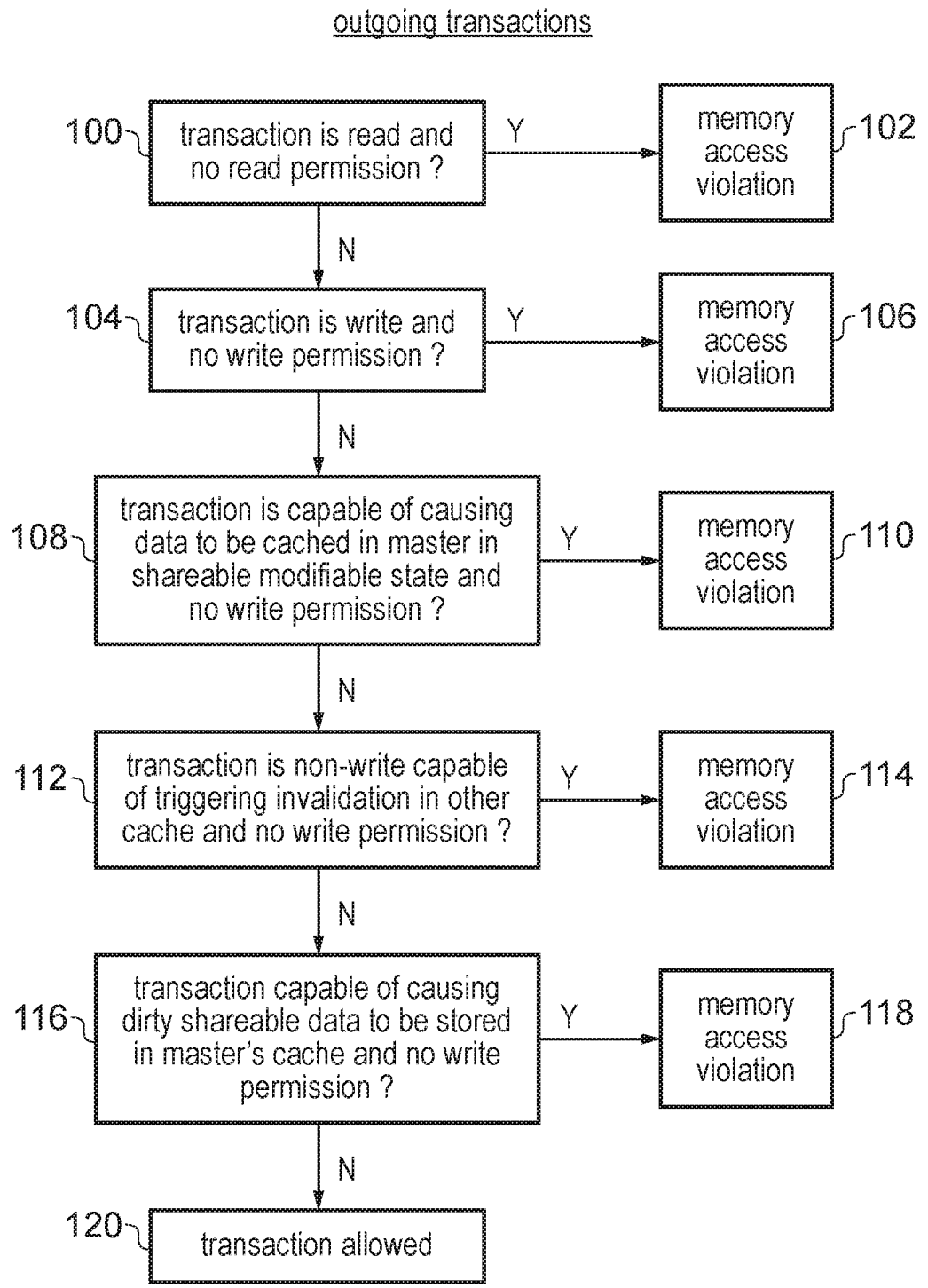
FIG. 4 illustrates steps for determining whether an outgoing coherency protocol transaction issued by a master device to the interconnect causes a memory access violation.

FIG. 4 is a flow diagram showing step 74 of FIG. 3 in more detail, illustrating a number of examples of criteria for determining whether an outgoing coherency protocol transaction issued by the master 6 to the interconnect 12 triggers a memory access violation. At step 100 the filtering circuitry 58 determines whether the outgoing transaction is a read transaction and the memory access permission data for the target address specifies that the master 6 does not have read permission for the target address. If this is not the case, then the method proceeds to step 104 for checking the next criterion. However, if the transaction is a read and there is no read permission then at step 102 the transaction is determined to cause a memory access violation. This prevents protected data being read or cached by masters without read access permission.

At step 104 it is determined whether the outgoing transaction is a write transaction and the memory access permission data for the target address indicates that the master 6 is prohibited from writing data to a region of the address space including the target address. If not, then the method proceeds to check the next criterion, while if the transaction is a write and there is no write permission then at step 106 a memory access violation is detected. Hence, this prevents protected data being written to by masters without write access permission.

At step 108 the filtering circuitry 58 determines whether the transaction is a transaction capable of causing data to be cached in the master device 6 in a shareable modifiable state when there is no write permission for the master device 6. If not, then the method proceeds to the next criterion. Here, a shareable modifiable state is a state in which coherency is to be maintained with other devices ("shareable"), and the master device 6 is allowed to modify the data without issuing a further coherency protocol transaction to the interconnect 12 ("modifiable"). If the transaction is capable of causing the data to be cached in the master in the shareable modifiable state and there is no write permission, then at step 110 a memory access violation is detected. It may seem counter intuitive that a transaction which causes data to be allocated to a master's cache (which would often be a read transaction) should require write permission in order to be allowed. However, if data can be cached in the master device in a modifiable state which does not require any further interaction with the interconnect 12 in order to update the data, then this would allow subsequent write operations by the master device 6 to be performed without the filter unit 50 being able to check the write operations against the memory access permissions defined in the table 56. Hence, by restricting transactions which can cause data to be cached at the master in a modifiable state to masters which have write permission, this effectively polices subsequent writes which the master may perform internally on its own cache. As most transactions capable of causing data to be cached in the modifiable state may be read transactions, in most cases the combination of steps 100 and 108 may result in such transactions requiring both read and write permission in order to proceed.

One may think that a similar check to step 108 should be made for data cached in the master in a non-shareable modifiable state, since this would again allow the master to update the data without any coherency transactions being exchanged with the interconnect 12, even if the data is from a read only region where there is no write permission. However, while one could implement such a check, it would not be essential. For performance reasons it may be preferable to continue to allow caching of non-shareable data from read-only regions within the master 6, so that the master 6 can access that read-only data faster than if it had to go to main memory each time the data is required. To enable this, it is possible for the master 6 to treat snoops to non-shareable cache lines as a cache miss (see FIG. 6 below), and in this case, even if the master 6 without write permission can update data in its internal cache 11, if the data is cached in the non-shareable state then this update would not be seen by other masters 4. Therefore, allowing caching in the non-shareable state for read-only regions would not run any risk of the master being able to affect the operation of other masters through writing to the read only region. Any effect outside the master itself of a local write of non-shareable data can be prevented by blocking a subsequent attempt to issue a write transaction to the interconnect 12, rather than through filtering of non-shareable reads.

At step 112 the filtering circuitry checks whether the outgoing transaction received at the master interface 52 is a non-write transaction which is capable of triggering invalidation in another cache 10 other than the cache 11 of the master 6 policed by the filter unit 50, when the master does not have write permission for the target address. If this is not the case, then the method proceeds to the next criterion to be checked. However, if the transaction is a non-write operation capable of triggering invalidation in another cache and there is no write permission for the target address, then at step 114 a memory access violation is detected. This criterion may be imposed to protect against leakage, because operations that cause cache lines to change state to an invalid state in another master can cause side channels which could allow leakage of some information to unprotected masters.

For example, a commonly used form of synchronization between masters (e.g. CPU cores) is a spin-lock, where a memory location is used to store a variable used to arbitrate access to shared resources. A master can "grab" a spin lock by performing an atomic read-modify-write operation (e.g. if the convention is that the lock is "free" when zero, then an atomic Compare And Swap operation may compare the location with 0, and if true, write 1 to the location to indicate that the master is taking exclusive access to the locked resource). If a second master wants to "grab" the spin lock this will fail as the lock would already be set to 1. Typically the second master will continuously retry ("spin") to "grab" the lock until successful. The drawback with this approach is that power is consumed by the second master spinning on the lock. For this reason CPUs can implement a mechanism that allows a CPU core to wait until the memory location of the spin lock is modified before it retries to "grab" the lock. A typical mechanism for hardware to implement this feature is to cache the location of the spin-lock and detect when the cache line is invalidated through a snoop (this will happen when another master updates the spin lock location). In a system that has two or more CPU cores these can be programmed to wait for modification of different memory locations. If the GPU in protected mode can cause invalidation of one of the cache lines waited on, then some information is transferred by detecting which cache line was invalidated (other variants are possible, for example varying the delay between invalidating the cache line), which can open up potential side channels for leakage of information relating to protected content. This can be avoided by requiring write permission for transactions which could cause invalidation in other masters.

At step 116, the filtering circuitry 58 determines whether the transaction is capable of causing dirty data to be stored in the master's cache 11 when the master 6 does not have write permission for the target address of the transaction. If so, then a memory access violation is detected at step 118. If the transaction is not capable of causing dirty data to be allocated in the cache 11, or the master does have write permission, then the transaction is allowed. Dirty data is data which, when invalidated in the master's cache 11, would need to be written back to a further cache or memory 16 beyond the point of coherency being monitored by the interconnect 12. The fact that data is held in a "dirty" coherency state does not necessarily mean that the data is different to all other values held in other caches. Some coherency protocols may allow data to be indicated as dirty even if it is the same as clean data held in other masters caches, with the "dirty" status simply indicating that one particular master may have responsibility for writing back the data to memory when the data is invalidated (similarly, a "clean" status may not necessarily mean that the data is the same as the corresponding data in a further cache or the main memory 16—the "clean" state may merely indicate that the master holding the clean data does not need to write back the data when that data is invalidated, as another master may have responsibility for writeback). It may not be immediately apparent why a master without write permission should be prevented from issuing transactions capable of allocating dirty data into its own cache, since such transactions would typically be read transactions rather than write transactions. However, if a master without write permission is allowed to cache data in the dirty state, then that particular master has responsibility for writing back the data on invalidation, and at that point the master may not be allowed to do this because it does not have write permission for the corresponding address. In the meantime, other masters caching the same value in the clean state may have invalidated the data without write back. Hence, allowing a master without write permission to cache data in a dirty state risks loss of the most up to date value for a given address, because the master might end up with the only version of the most up to date value and it will not be allowed to write it back to memory. This problem can be prevented by detecting a memory access violation when a master without write permission attempts to issue a transaction which could lead to dirty data being stored in its cache.

Hence, if none of the steps 100, 104, 108, 112, 116 detects a memory access violation, then at step 120 the transaction is allowed to proceed to its destination as normal.

Note that with steps 108, 112, 116 where it is detected whether a transaction is capable of causing data to be cached in the master in a certain coherency state, or capable of triggering invalidation in another cache, the filtering circuitry 58 may detect this based merely on the type of transaction, rather than making any determination of whether the transaction would actually cause such an effect. Whether data is actually cached in a certain state or whether an invalidation is triggered in another cache will typically depend on the coherency status of data in other masters' caches, and this may not be known to the filter unit 50. Hence, steps 108, 112, 116 may simply be checking for whether the outgoing transaction from the master 6 is of a particular transaction type that could potentially cause the effect policed against by the filter unit 50.

While FIG. 4 shows a series of criteria which can be applied for filtering transactions, not all of these criteria need be implemented in a particular embodiment. Some implementations may choose to apply even more restrictive criteria than shown in FIG. 4, with some additional checking steps also being implemented. Other implementations may omit one or more of the steps. For example, as will be explained below with respect to a particular embodiment based on AMBA® 4 ACE, it is possible to relax the requirements of FIG. 4 if it is not considered essential for the snoop filter 20 to be consistent with the contents of the cache 11 of the master device 6. For example, the filter unit 50 may not apply step 108, so that for read-only regions of the address space, caching of shareable data is permitted (in this case filtering of snoop transactions as discussed in FIG. 5 may instead be the mechanism for preventing updates to local values in the cache 11 being seen by other masters if the master 6 having that cache 11 does not have write permission).

Figure 5:
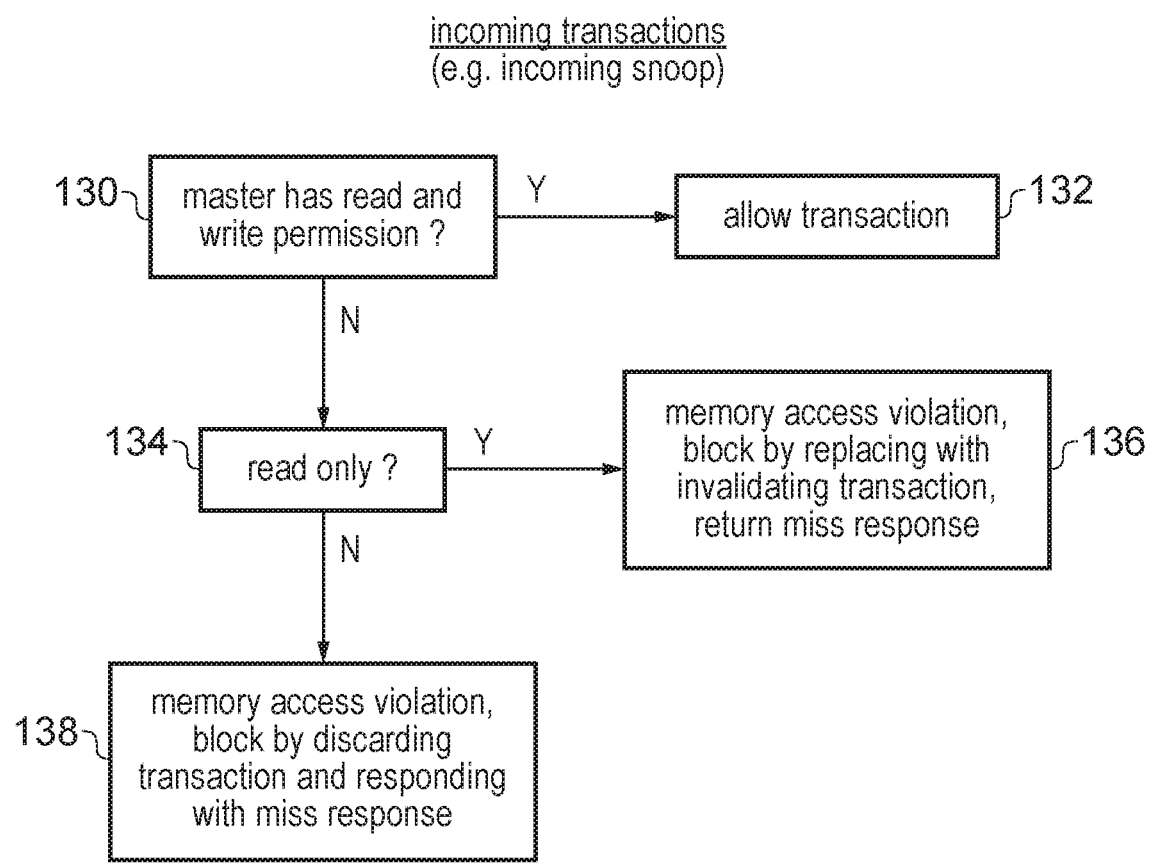
FIG. 5 is a flow diagram illustrating a method of checking whether incoming snoop transactions sent from the interconnect to the master cause a memory access violation.

FIG. 5 shows a method for filtering incoming snoop transactions received from the interconnect 12 en route to the masters device 6. FIG. 5 represents part of the checking performed at step 74 of FIG. 3. At step 130 the filtering circuitry 58 looks up the memory access permission table 56 and determines whether the master device 6 receiving the snoop transaction has both read and write permission for the target address. If so then at step 132 the snoop transaction is allowed to proceed. The transaction is blocked if the master does not have both read and write permission, but the particular technique for blocking the snoop depends on the permissions granted to the master for the target address. At step 134 it is determined whether the master has read only access to the target address, and if so then at step 136 the snoop is blocked by replacing it with an invalidating transaction for triggering invalidation of any data associated with the target address from the master's cache 11. A miss response is returned to the interconnect 12 indicating that the address missed in the master's cache 11. If no access is permitted to the target address or write only access is permitted, at step 138 the memory access violation is detected and the snoop is blocked by discarding the snoop transaction and not forwarding it to the master device 6. Also, a miss response is provided to the interconnect 12 in the same way as at step 136.

Hence, snoops are blocked if the master does not have write permission for the required address. This is because returning snoop data in response to a snoop transaction could result in data being updated in another master's cache, which would effectively imply that the master is writing data to the specified address. Similarly, snoops may be blocked if there is no read permission to prevent side channel information about protected data (such as which addresses are being accessed by other masters) being provided to a master which is not allowed to read the data. Blocking of snoops is handled differently depending on whether the master has read only access or write only access. For read only access, the snoops are blocked by replacing them with invalidating transactions, to ensure consistency between the snoop filter 20 and the data in the cache 11, while for write only regions of memory, snoops to those addresses are blocked completely to avoid side band channels through which information about access to protected content could be leaked.

Figure 6:
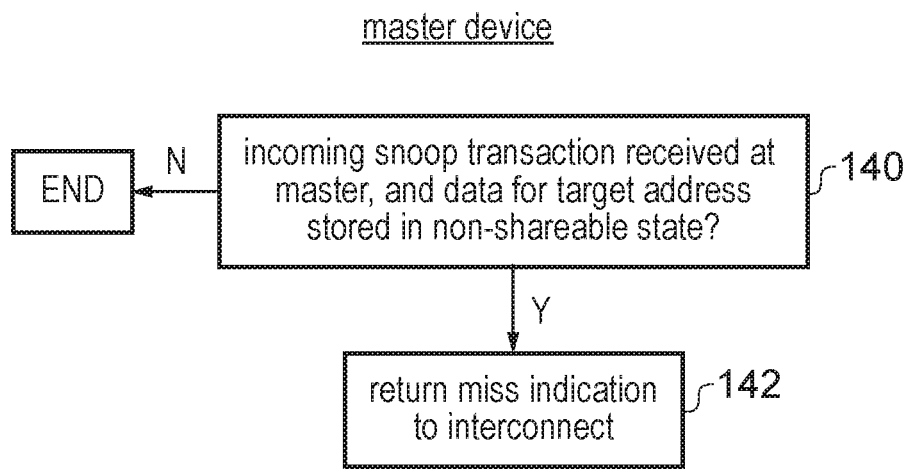
FIG. 6 is a flow diagram illustrating a master device responding to incoming snoops for cached data in a non-shareable state by returning an indication that the data is not stored in the cache.

FIG. 6 is a flow diagram showing a behaviour of the master device 6 which can help simplify the operation of the filter unit 50. At step 140, the master device 6 detects whether an incoming snoop transaction has been received for which the data associated with the target address is held within its cache 11 in a non-shareable state (a state where coherency with other masters does not have to be maintained by the interconnect 12). If not, then the master device 6 handles any other type of transaction in the manner appropriate to that type of transaction, and continues to check for incoming snoops targeting non-shareable addresses at step 140. If the incoming snoop hits against data which is cached in the non-shareable state then at step 142 the master 6 returns a miss indication to the interconnect 12 despite the fact that the snoop actually hit in the cache 11. When this feature of the master device is combined with the transaction checking criteria as shown in FIG. 4 for outgoing transactions, this means that it is not necessary to filter incoming snoop transactions using the filter unit 50. This can simplify the filter unit architecture since transactions on the snoop channel 64 do not need to be looked up in the memory access permission table 56.

The reason why it is not necessary to filter snoops coming on the snoop channel 64 when the master behaves as shown in FIG. 6 is as follows. Snoops are generated in response to transactions by a first master (master A). The permissions for the transaction are checked by either the MMU/MPU 30 or a filter unit 50 at master A. Therefore, if an incoming snoop is received at a second master (master B), this implies that the snoop itself has already been checked at master A and so it does not need to be checked again at master B. A snooped master B is allowed to respond with shareable clean (unmodified) data, as the snoop has already been validated to have permission to access the data. A snooped master B is only allowed to respond with shareable dirty data if it has write permission to the snooped location. This is ensured by not allowing transactions from master B that can result in a cache line in a shareable modifiable state unless master B has write permission to the cached location (step 108 of FIG. 4). For non-shareable cache lines there is no guarantee that permissions have been checked, and thus returning data for snoops to non-shareable cache lines is not allowed without a permission check. Either master B enforces this implicitly by considering all snoops to non-shareable cache lines to miss (as in FIG. 6), or if the master does not support this behaviour, incoming snoops are filtered by the filter unit 50, and if the snoop is to a location where master B lacks write permission, the filter unit 50 returns a miss for the snoop response.

Figure 7:
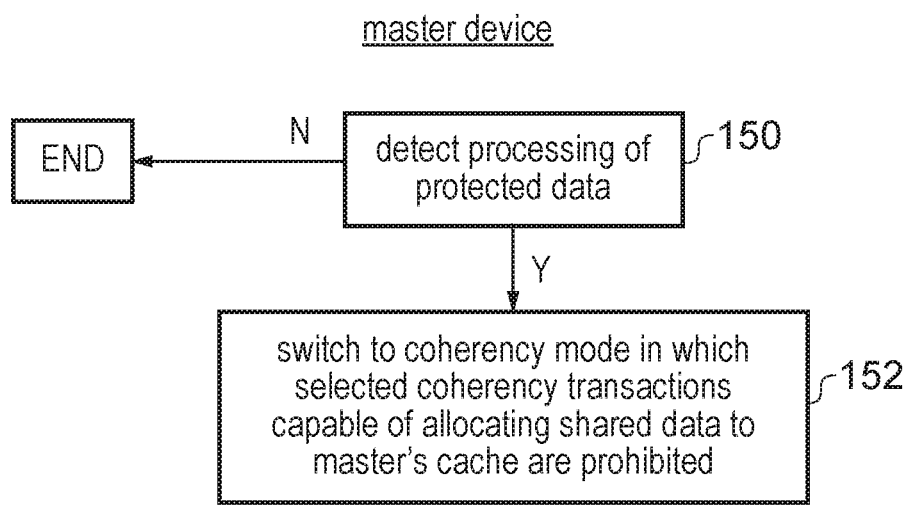
FIG. 7 illustrates a method of switching a master device to a predetermined coherency mode in response to processing of protected data.

FIG. 7 shows another behaviour of the master device which can help reduce the complexity of the filter unit 50. At step 150, the master device 6 detects whether it is processing protected data. For example sections of code intended to use protected data could be marked in some way to allow the processor 9 to detect whether it is entering a protected section. If processing detected data, then at step 152 the master 6 switches to a predetermined coherency mode in which selected coherency transactions capable of allocating shareable data to the master's cache 11 are prohibited. Shareable data is data stored in the state in which coherency is to be maintained between the shareable data stored in the cache and data stored in at least one other cache. On the other hand, non-shareable data is data which can be allocated to a master's cache and for which coherency does not need to be maintained. When protected data is no longer being processed, the master could switch back to a standard coherency mode which does permit transactions capable of allocating shareable data to the cache 10.

For example, the predetermined coherency mode to which processing is switched at step 152 may be a coherency mode intended for use with uncached masters which do not have a cache at all. A master without a cache may merely require a "one-way" coherency to be maintained, so that the uncached master sees the most up to date data when it issues reads to addresses which could be cached in other master's caches, and the effects of writes issued by the uncached master are seen by other masters, but there is no need to snoop data in the uncached master or use types of transactions for implementing shareable coherency states, for example. Such a one-way coherent mode may normally be used for input/output devices which control input/output data to a peripheral device, which may not have a cache. However, by switching to such a coherency mode for a cached master 6, this means that steps 108, 112, and 116 of FIG. 4 are not required since the transaction types checked in these steps are typically transactions used for managing coherency of shared data in the master's cache. Therefore, in the predetermined coherency mode the filter unit may merely need to check reads for read permission and writes for write permission at steps 100, 104, simplifying the filtering circuitry 58. Nevertheless, if the master device 6 does not support such a predetermined coherency mode then alternatively the filter unit may include the additional checking steps as in FIG. 4.

Another mechanism for achieving the same effect would be for the master to permit transactions capable of allocating shareable data, but to ignore all snoops in the predetermined coherency mode (snoops being ignored by returning a miss to the interconnect and blocking any effect of the snoop on the master). Again, in this case a simple checking of read transactions against read permission and write transactions against write permission may be enough to enforce the required memory access permissions, as not acting on any snoops means that, other than in response to a read/write transaction, it is not possible for data to leak into a master not having read permission or out of a master not having write permission.

Two particular examples of filtering coherency protocol transactions will now be described with reference to the AMBA® 4 ACE protocol (hereafter referred to as "ACE"). It will be appreciated that this is just one example and the general technique discussed above could also be described by other protocols. In ACE, for a given master's cache, data from a given target address can be considered to be in one of the following coherency states:
  Dirty (non-shareable, so don't need to maintain coherency with other devices; data should be written back if invalidated);
  Clean (non-shareable; data does not need to be written back if invalidated);
  UniqueDirty (shareable, so need to maintain coherency with other devices; modifiable, so master can update cache without checking with interconnect; data should be written back if invalidated);
  SharedDirty (shareable; non-modifiable, so master has to check with interconnect when updating cached data; data should be written back if invalidated);
  UniqueClean (shareable; modifiable; no need to write back if invalidated)
  SharedClean (shareable; non-modifiable; no need to write back if invalidated)
  Invalid (data is not held in cache).

Note that for non-shareable locations all non-shareable states (Invalid, Clean, Dirty) are considered modifiable as there is no need to check with the interconnect 12 on updating data in these locations. ACE defines a range of different transaction types which can be issued on the read, write, snoop channels 60, 62, 64 respectively, as explained in Table 1 below. Note that while Table 1 lists some example use cases for certain transactions, it will be appreciated that the same transactions could also be used for other purposes. The transaction types marked with an asterisk represent a restricted subset of transaction types used in an "ACE-Lite" mode corresponding to the predetermined coherency mode discussed above for FIG. 7.

TABLE 1

| Transaction type | Meaning |
| --- | --- |
| ReadNoSnoop * | Request reading of data to be cached in non-shareable state |
| WriteNoSnoop * | Request that data held in non-shareable state is written to memory. |
| ReadOnce * | Used by masters reading data that is shareable but where the master will not retain a copy, so that other masters with a cached copy do not need to change cache state. |
| WriteUnique * | Write that triggers other masters to clean (by writing dirty copies back to memory) and invalidate data for the same address held in other caches. Can be used by uncached masters writing shareable data, or by cached masters, e.g. when writing to a location without reading it first. |
| WriteLineUnique * | Like WriteUnique, but it operates on a whole cache line, so there is no need to write back dirty copies. |
| ReadShared | Used for shareable reads where the master can accept data in any coherency state. |
| ReadClean | Used for shareable reads where the master requires data to be returned in a Clean state, and Dirty states cannot be accepted. If other devices hold dirty cached data for the same address, they can keep the dirty data, but the responsibility for writing back the dirty data to memory does not pass to the master that issued the ReadClean transaction. |
| ReadNotSharedDirty | Used for shareable reads where the master can accept data in any coherency state other than Shared Dirty. |
| MakeUnique | Request that all other copies are invalidated from other masters' caches. |
| ReadUnique | Request that all other copies of the data are cleaned and invalidated from other caches, and also read the data into the requesting master's cache in either the UniqueClean or UniqueDirty state |
| CleanUnique | Request that all other copies are cleaned and invalidated from other master's caches, but no need to read the cleaned data (e.g. the master may already have the copy of the cache line in its own cache, which may have been made up to date earlier through the coherency protocol). |
| WriteClean | Write the Dirty cache line back to memory but retain a copy in the Clean state. |
| Evict | Indicates to interconnect that clean data has been evicted from the cache, to allow the interconnect to keep its snoop filter consistent. |

TABLE 1-continued

| Transaction type | Meaning |
| --- | --- |
| WriteBack | Write data back to memory and indicate to interconnect that the data is also being evicted from the cache, so that snoop filter can be made consistent. |
| CleanShared * | Request that all other copies of data are cleaned from other masters' caches, but other masters are allowed to retain the data in Clean state. |
| CleanInvalid * | Request that all other copies of data are cleaned and invalidated from other masters' caches |
| MakeInvalid * | Request that all other copies of data are invalidated from other masters' caches, no need to write back data even if it is Dirty |

Note that for ReadOnce, ReadShared, ReadClean, ReadNotSharedDirty, ReadUnique, CleanShared, CleanInvalid and MakeInvalid, these transactions are sent by a requesting master to the interconnect 12 on the read channel 60, and in response the interconnect 12 may sent corresponding snoop transactions to other masters over the snoop channel 64, to trigger the effects required at those other masters (e.g. to request return of snooped data, or to trigger invalidation or cleaning of data at the other master). Hence, these terms are used to refer both to the initial read channel transaction sent from the initiating master, and to the corresponding snoops sent on the snoop channel 64 to other masters by the interconnect 12.

Two example implementations are discussed below with reference to these transactions defined for ACE. It will be appreciated that other protocols may have transactions with corresponding functionality to those defined above, but with different names, and so while the transaction labels used by ACE are used below for conciseness, it will be understood that the same techniques can be used for any similar transaction having the corresponding functionality described in Table 1.

The filter unit 50 filters the read request (AR), write request and data (AW/W), snoop request AC and snoop response and data (CR/CD) channels. The number of simultaneously active transactions on the AR and AW/W (read and write request) channels make it impractical to filter the R and B (read and write response) channels, as that would imply tracking the original request.

The mechanism described is based on enforcing read and write permissions separately. E.g. a memory region can be designated as full access, read-only, write-only or no access for different masters.

There are a number of aspects to consider for the implementation of the permission enforcement:
1. Should the implementation require that the interconnect snoop filter and coherent caches remain consistent? Doing so simplifies the process of changing permission for a memory area.
2. Two different fault models can be used. Option b is compatible with keeping the snoop filter and coherent caches consistent.
   a. AR and AW/W permission violations are ignored, reads return zero, and writes have no effect.
   b. AR and AW/W permission violations result in a bus error, without any other side effects.
3. Operations that cause cache lines to change state to invalid state in other masters can be detected, and can cause protected data to leak. This can be prevented through two measures:
   a. By requiring write permissions for all AR and AW transactions that can cause cache line invalidation in other masters even if they are not write operations (e.g. ReadUnique or CleanInvalid).
   b. By requiring read permission for incoming snoops on the AC channel that require invalidation of a cache line.
4. In the ACE protocol it is possible to pass the responsibility to write back dirty data to another master. This can cause problems in combination with enforcing access permissions —if the master to which the writeback responsibility is passed does not have write permission (e.g. only read permission) then data loss can result.
   a. By requiring write permission for operations that can result in dirty read data the data loss can be prevented. In some cases read operations can be modified, e.g. ReadNotSharedDirty modified to to ReadClean, instead of blocked. Note that there is overlap with point 3.

Note on point 2 that blocked snoops on the AC/CR/CD channel do not generate an error. Two mechanisms can be used for blocking snoops:

Block snoop, in this case the snoop transaction is not forwarded to the master, and a response to the interconnect is generated indicating there was no matching cache line in the master.

Invalidate and discard, in this case the snoop is modified to an invalidating snoop (typically MakeInvalid, but ReadUnique or CleanInvalid could also be used) and the response is modified to indicate no matching cache line in the master (and any snoop data returned on the CD channel is discarded).

In many cases full functionality for shareable memory areas is only possible for regions with full access:
   ReadUnique is not allowed for read-only areas when points 3 or 4 are applied.
   Write-only areas cannot be shareable when point 3b is applied.

Two example implementations will now be described.

$1^{st}$ Example Implementation

This example has the following properties:
   Keeps the snoop filter consistent with the coherent caches
      Hence, a bus error (e.g. decode error) is returned for permission violations on the AR and AW/W channels
   Prevent shareable cache line states for read only (RO) regions that allow the master to modify the cache line. This is possible as shareable cache lines require interaction between the master and the interconnect before the master is allowed to modify the cache line when using a MESI based or similar coherency protocol.
   Cache coherency sideband channels are protected against in the filter unit. The concern is information leaking into a master through a write only (WO) region, or information leaking out of a master through a RO region. The main measures for mitigating this is:

Block read transactions in RO regions that cause invalidation in other masters caches.

Prevent caching of shareable WO regions.

Avoid dirty read data if write permission is not present for a memory region (point 4 above)

Hence, all of points 1, 2, 3, and 4 above apply.

Tables 2 to 4 describe how the filter unit 50 can control filtering of each type of transaction based on the memory access permissions for the target address for the corresponding master 6:

TABLE 2

Read request channel filtering behaviour

| AR channel transaction | No access | Read-only | Write-only | Read-write |
|---|---|---|---|---|
| ReadNoSnoop | Block | Pass through | Block | Pass through |
| ReadOnce | Block | Pass through | Block | Pass through |
| ReadShared | Block | Block | Block | Pass through |
| ReadClean | Block | Block | Block | Pass through |
| ReadNotSharedDirty | Block | Block | Block | Pass through |
| ReadUnique | Block | Block | Block | Pass through |
| CleanUnique | Block | Block | Block | Pass through |
| MakeUnique | Block | Block | Block | Pass through |
| CleanShared | Block | Block | Pass through | Pass through |
| CleanInvalid | Block | Block | Pass through | Pass through |
| MakeInvalid | Block | Block | Pass through | Pass through |

Note that shareable and cacheable read, make and clean transactions are blocked for RO regions to ensure no cache line states that allows for modification of the cache line by the master are allowed. This can be relaxed if the upstream master ensures that Read Once, ReadShared, ReadClean and ReadNotSharedDirty (with clean response) transactions do not result in the upstream master holding the cache line in a modifiable state. If this restriction is relaxed the ReadShared and ReadNotSharedDirty transactions should be modified to ReadClean for RO areas. Similarly CleanShared can be allowed for RO areas if the master ensures that the transaction does not result in a shareable and modifiable cache line state.

ReadOnce transactions can be allowed for read-only memory regions because the master issuing a ReadOnce transaction is only allowed to cache the data read if the cache line was already present in the cache (and therefore also tracked by the snoop filter) before ReadOnce is issued. As ReadOnce is not allowed to allocate a new shareable cache line in the master, the snoop filter state should not change as a result of the ReadOnce transaction. Regardless Clean-Shared can be allowed for non-shareable RO areas, however CleanInvalid cannot unless side band channels are tolerated, and MakeInvalid could cause data modification, so is not an allowed cache maintenance operation in an RO area (the cache maintenance operations are CleanShared, CleanInvalid and MakeInvalid).

CleanUnique and Make Unique are not allowed for WO regions in order to not cache shareable data in WO regions (cache coherency side band channel mitigation).

Any variant that has more restrictive permissions applied (e.g. blocks CleanUnique/MakeUnique for WO areas) also meets the requirements above, but provides less functionality.

TABLE 3

Write request channel filtering behaviour

| AW channel transaction | No access | Read-only | Write-only | Read-write |
|---|---|---|---|---|
| WriteNoSnoop | Block | Block | Pass through | Pass through |
| WriteUnique | Block | Block | Pass through | Pass through |
| WriteLineUnique | Block | Block | Pass through | Pass through |
| Non-Shareable WriteClean | Block | Block | Pass through | Pass through |
| Shareable WriteClean | Pass through | Pass through | Pass through | Pass through |
| Non-Shareable WriteBack | Block | Block | Pass through | Pass through |
| Shareable WriteBack | Pass through | Pass through | Pass through | Pass through |
| Evict | Pass through | Pass through | Pass through | Pass through |
| Non-shareable WriteEvict | Block | Discard | Pass through | Pass through |
| Shareable WriteEvict | Pass through | Pass through | Pass through | Pass through |

Shareable WriteClean, WriteBack and WriteClean transactions should not occur for read-only or no-access areas. Non-shareable WriteClean, WriteBack and WriteEvict transactions may occur for read-only areas, and are permission checked. Non-shareable WriteEvict for read-only areas can in theory be allowed, however silently discarding these transactions for non-shareable read-only areas avoids a potential issue with content protection integrity. WriteEvict for read-only non-shareable regions can cause older values to be restored by a master with read-only permissions, this can be detected and used for communication through a read-only memory region. Any variant that has more restrictive permissions applied also meets the requirements above, but provides less functionality.

TABLE 4

Snoop channel filtering behaviour

| AC channel transaction | No access | Read-only | Write-only | Read-write |
|---|---|---|---|---|
| ReadOnce | Block | Invalidate & discard | Block | Pass through |
| ReadShared | Block | Invalidate & discard | Block | Pass through |
| ReadClean | Block | Invalidate & discard | Block | Pass through |
| ReadNotSharedDirty | Block | Invalidate & discard | Block | Pass through |
| ReadUnique | Block | Invalidate & discard | Block | Pass through |
| CleanShared | Block | Invalidate & discard | Block | Pass through |
| CleanInvalid | Block | Invalidate & discard | Block | Pass through |
| MakeInvalid | Block | Invalidate & discard | Block | Pass through |

For read-only areas the motivation for invalidate & discard for all snoops is:

Returning snoop data requires write permission, so all snoop responses are modified to indicate no valid cache line in the master.

To ensure consistency with interconnect snoop filter this requires that any cache line in the master is invalidated.

Snoops to write-only areas are blocked to avoid side band channels through the master detecting invalidations of non-shareable write-only cache lines through snoops.

The approach described for the first example implementation has the following properties:

Support for shareable memory is very limited for RO regions, i.e. only Read Once can be used for shareable RO regions (typically implies shareable RO regions cannot be cached, depending on master behaviour).

Support for shareable memory is very limited for WO regions, i.e. only Write Unique/WriteLineUnique can be used for shareable WO regions (typically implies shareable WO regions cannot be cached, depending on master behaviour).

Cache coherency sideband channels are mitigated, the upstream master cannot issue transactions for RO areas that are expected to cause cache line invalidations in other masters, and shareable regions are not cached in WO regions.

If the master always responds to an incoming snoop that matches a non-shareable cache line as a miss then there is no need for filtering snoops (i.e. the AC, CR and CD channels). The motivation for why it is not necessary to filter snoops in this case is:

Only non-shareable cache lines can be allocated without external interaction

Shareable cache lines are completely blocked for no access regions

Dirty shareable cache lines are not possible for read-only areas. Clean cache lines are allowed to be snooped for read-only areas.

Shareable cache lines are not possible for WO regions, so there is no need to filter incoming snoops for WO regions if snoops to non-shareable cache lines miss.

Note that if the snoops are not filtered cache maintenance when changing permissions for an area becomes more critical in some cases—e.g. on changing the memory access permission data for a given region of the address space, a broadcast cache invalidate can be triggered for all addresses in that region.

If the master device switches to the 10-coherent protocol mode (which uses only the subset of transaction types marked with an asterisk in Table 1 above) when processing protected data as shown in FIG. 7 discussed above, then many of the transaction types are not used, and the filter unit 50 may be simpler since the remaining subset of transactions may simply be filtered such that reads are rejected if there is no read permission and writes are blocked if there is no write permission.

Note that filtering of transactions may also be required when processing non-protected data. However, for processing non-protected data, the required permission types for some masters (e.g. the GPU) may only be "full access" and "no access", which simplifies the filtering of the coherency protocol transactions compared to the protected processing where read-only access may also be required as well as full access and no access.

Second Example Implementation

It is also possible to define variants where the coherent caches and the interconnect snoop filter have different views on what cache lines are held in a unique or dirty state by a master. Specifically a master may consider a cache line held in a unique and/or dirty state whereas the snoop filter does not. The cause of this is that some transactions may have been modified such that the snoop filter cannot track cache line state. This could lead to protocol violations as well as coherency violations if a master tries to perform a forbidden access, if permission changes are not carefully managed— again, when memory access permission data is changed then a broadcast cache invalidate for the changed region of the address space may be triggered to ensure that inappropriate data cannot remain in a master's cache.

With this implementation, ReadUnique transactions can be modified to ReadClean and/or CleanShared transactions can be allowed for read-only areas. In this case the master can hold shareable cache lines in unique state for read-only areas. Facilitating ReadUnique and/or CleanShared transactions for read-only areas has the following implications:

All read transactions can be supported for read-only areas

A master can modify data in read-only regions in its internal caches, however this will not be visible outside the master itself.

Snoop transactions should be filtered—otherwise a snooped master may return dirty data for read-only regions.

Special care is taken when changing permissions for a region to synchronize the snoop filter and coherent caches, e.g. to invalidate the coherent caches, otherwise protocol violations may be visible to the interconnect.

Also, in the ACE specification a RRESP[3] signal is used to indicate if a read response is allowed to be cached in unique state. For the ReadUnique the specification states that RRESP[3] should be low. The second example implementation cannot guarantee this, so the master should ignore the value of RRESP[3] for ReadUnique responses.

Tables 5 to 7 show the filtering behaviour in this implementation example:

TABLE 5

Read request channel behaviour - permissive implementation

| AR channel transaction | No access | Read-only | Write-only | Read-write |
| --- | --- | --- | --- | --- |
| ReadNoSnoop | Block | Pass through | Block | Pass through |
| ReadOnce | Block | Pass through | Block | Pass through |
| ReadShared | Block | ReadClean | Block | Pass through |
| ReadClean | Block | Pass through | Block | Pass through |
| ReadNotSharedDirty | Block | ReadClean | Block | Pass through |
| ReadUnique | Block | ReadClean | Block | Pass through |
| CleanUnique | Block | Block | Block | Pass through |
| MakeUnique | Block | Block | Block | Pass through |
| CleanShared | Block | Pass through | Pass through | Pass through |
| CleanInvalid | Block | Block | Pass through | Pass through |
| MakeInvalid | Block | Block | Pass through | Pass through |

Note that ReadShared, ReadNotSharedDirty and ReadUnique transactions are modified to ReadClean for ReadOnly areas to ensure no dirty snoop data is passed to a master without write permission. Any variant that has more restrictive permissions applied (e.g. blocks ReadShared for RO areas instead of modifying it to ReadClean) also meets the requirements above, but provides less functionality.

TABLE 6

Write request channel behaviour - permissive implementation

| AW channel transaction | No access | Read-only | Write-only | Read-write |
| --- | --- | --- | --- | --- |
| WriteNoSnoop | Block | Block | Pass through | Pass through |
| WriteUnique | Block | Block | Pass through | Pass through |
| WriteLineUnique | Block | Block | Pass through | Pass through |
| WriteClean | Block | Block | Block | Pass through |
| WriteBack | Block | Block | Block | Pass through |

TABLE 6-continued

Write request channel behaviour - permissive implementation

| AW channel transaction | No access | Read-only | Write-only | Read-write |
|---|---|---|---|---|
| Evict | Block | Discard | Discard | Pass through |
| WriteEvict | Block | Discard | Discard | Pass through |

If the RAZ/WI (Reads-As-Zero/Writes Ignored) fault model is used then inconsistent WriteClean, WriteBack, Evict and WriteEvict transactions may occur for WO regions. Any variant that has more restrictive permissions applied also meets the requirements above, but provides less functionality.

TABLE 7

Snoop channel behaviour - permissive implementation

| AC channel transaction | No access | Read-only | Write-only | Read-write |
|---|---|---|---|---|
| ReadOnce | Block | Invalidate & discard | Block | Pass through |
| ReadShared | Block | Invalidate & discard | Block | Pass through |
| ReadClean | Block | Invalidate & discard | Block | Pass through |
| ReadNotSharedDirty | Block | Invalidate & discard | Block | Pass through |
| ReadUnique | Block | Invalidate & discard | Block | Pass through |
| CleanShared | Block | Invalidate & discard | Block | Pass through |
| CleanInvalid | Block | Invalidate & discard | Block | Pass through |
| MakeInvalid | Block | Invalidate & discard | Block | Pass through |

Snoop filtering is the same as for the first implementation example.
For read-only areas the motivation for invalidate & discard for all snoops is:
  Returning snoop data requires write permission, so all snoop responses are modified to indicate no valid cache line in the master.
  To ensure consistency with interconnect snoop filter this requires that any cache line in the master is invalidated.
Snoops to write-only areas are blocked to avoid side band channels through the master detecting invalidations of non-shareable write-only cache lines through snoops.
The approach described for the permissive implementation has the following properties:
  Full support for shareable RO regions.
  Only non-shareable memory is supported for cacheable write-only regions. However, write-only access is supported for non-shareable memory and non-cacheable shareable memory.
  Cache coherency sideband channels are mitigated.
  Snoop channel filtering is always required.
  The RAZ/WI (Reads-As-Zero/Writes Ignored) fault model can be supported.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
   a filter comprising:
   interface circuitry to intercept coherency protocol transactions exchanged between a first master device and an interconnect for managing coherency between a first cache comprised by said first master device and at least one other cache or a second master device; and
   filtering circuitry to filter the coherency protocol transactions in dependence on memory access permission data defining which regions of an address space the first master device is allowed to access;
   wherein in response to an outgoing coherency protocol transaction issued from said first master device to said interconnect after a lookup in the first cache by the first master device, the filtering circuitry is configured to block the outgoing coherency protocol transaction when a memory access permission violation is detected for the outgoing coherency protocol transaction in dependence on the memory access permission data; and
   wherein the filtering circuitry is configured to detect said memory access permission violation when the outgoing coherency protocol transaction is a read transaction capable of causing data to be stored in said first cache in a shareable modifiable coherency state in which coherency is to be maintained between the data in said first cache and said at least one other cache or the second master device, and the first master device is allowed to modify the data without issuing a further coherency protocol transaction to said interconnect, and the memory access permission data specifies that the first master device is:
   prohibited from writing data to a region of the address space including a target address specified by the outgoing coherency protocol transaction; and
   permitted to read data from said region of the address space including the target address specified by the outgoing coherency protocol transaction.

2. The apparatus according to claim 1, wherein the filtering circuitry is configured to filter snoop transactions exchanged between the first master device and the interconnect in dependence on the memory access permission data.

3. The apparatus according to claim 1, wherein the memory access permission data defines for a given region of the address space:
   whether the first master device is allowed to read data from the given region; and
   whether the first master device is allowed to write data to the given region.

4. The apparatus according to claim 1, wherein the filtering circuitry is configured to block the outgoing coherency protocol transaction by triggering an error condition when the memory access permission violation is detected for the outgoing coherency protocol transaction.

5. The apparatus according to claim 1, wherein the filtering circuitry is configured to block the outgoing coherency protocol transaction by:

returning dummy data to said first master device when the outgoing coherency protocol transaction is a read transaction; and preventing write data associated with the outgoing coherency protocol transaction being passed to said at least one other cache or the second master device or a memory when the outgoing coherency protocol transaction is a write transaction.

6. The apparatus according to claim 1, wherein the filtering circuitry is configured to block the outgoing coherency protocol transaction by replacing the outgoing coherency protocol transaction with an alternative coherency protocol transaction.

7. The apparatus according to claim 1, wherein the filtering circuitry is configured to detect said memory access permission violation when the outgoing coherency protocol transaction is a read transaction and the memory access permission data specifies that the first master device is prohibited from reading data from a region of the address space including a target address specified by the read transaction.

8. The apparatus according to claim 1, wherein the filtering circuitry is configured to detect said memory access permission violation when the outgoing coherency protocol transaction is a write transaction and the memory access permission data specifies that the first master device is prohibited from writing data to a region of the address space including a target address specified by the write transaction.

9. The apparatus according to claim 1, wherein the filtering circuitry is configured to detect said memory access permission violation when the outgoing coherency protocol transaction is a transaction, other than a write transaction, which is capable of triggering invalidation of data in said at least one other cache, and the memory access permission data specifies that the first master device is prohibited from writing data to a region of the address space including a target address specified by the outgoing coherency protocol transaction.

10. The apparatus according to claim 1, wherein the filtering circuitry is configured to detect said memory access permission violation when the outgoing coherency protocol transaction is capable of causing dirty data to be stored in said first cache, and the memory access permission data specifies that the first master device is prohibited from writing data to a region of the address space including a target address specified by the outgoing coherency protocol transaction.

11. The apparatus according to claim 1, wherein the filtering circuitry is configured to block an incoming coherency protocol transaction issued from said interconnect to said first master device, when a memory access permission violation is detected for the incoming coherency protocol transaction in dependence on said memory access permission data.

12. The apparatus according to claim 11, wherein the filtering circuitry is configured to block the incoming coherency protocol transaction by preventing the incoming coherency protocol transaction being passed to said first master device.

13. The apparatus according to claim 11, wherein the filtering circuitry is configured to block the incoming coherency protocol transaction by replacing the incoming coherency protocol transaction with an invalidating coherency protocol transaction for triggering invalidation from the first cache of any data associated with the target address specified by the incoming coherency protocol transaction.

14. The apparatus according to claim 11, wherein the filtering circuitry is configured to return a miss response to the interconnect in response to the blocked incoming coherency protocol transaction, the miss response indicating that a target address specified by the incoming coherency protocol transaction missed in the first cache.

15. The apparatus according to claim 11, wherein the filtering circuitry is configured to block an incoming coherency protocol transaction when the memory access permission data specifies that the first master device is prohibited from reading data from a region of the address space including a target address specified by the incoming coherency protocol transaction or is prohibited from writing data to said region of the address space including said target address.

16. The apparatus according to claim 1, wherein the filtering circuitry is configured to lookup the memory access permission data in dependence on a target address of a coherency protocol transaction received from one of the first master device and the interconnect, and control issuing of a coherency protocol transaction specifying said target address to whichever of the first master device and the interconnect was not referenced as the one of the first master device and the interconnect in dependence on the looked up memory access permission data.

17. The apparatus according to claim 1, wherein the filtering circuitry is configured to lookup the memory access permission data in dependence on a target address of a coherency protocol transaction received from one of the first master device and the interconnect, map the target address to a translated address in dependence on address translation data, and
control issuing of a coherency protocol transaction specifying said translated address to the other of the first master device and the interconnect in dependence on the looked up memory access permission data.

18. The apparatus according to claim 17, wherein the filtering circuitry is configured to map the target address to the translated address using a translation scheme providing a one-to-one mapping between any given target address and the corresponding translated address.

19. The apparatus according to claim 1, comprising;
said first master device comprising said first cache;
said second master device comprising a second cache; and
said interconnect to manage coherency between said first cache and said at least one other cache or the second master device using coherency protocol transactions exchanged between the first master device and the interconnect;
the second master device comprises a memory permission unit to check, before accessing the second cache, whether a data access operation issued by the second master device is allowed to proceed or triggers a memory access violation, and to perform a lookup in the second cache when the memory permission unit determines that the data access operation issued by the second master device is allowed to proceed; and
the first master device does not have said memory permission unit.

20. The apparatus according to claim 19, wherein in response to a snoop transaction received from the interconnect specifying a target address for which data is currently stored in the first cache in a non-shareable coherency state, the first master device is configured to return a miss indication indicating that the target address missed in said first cache.

21. The apparatus according to claim 19, wherein the first master device has a predetermined coherency mode in which selected coherency transactions are prohibited, said selected coherency transactions including at least coherency transactions capable of causing data to be allocated to the first cache in a shareable state in which coherency is to be maintained between the shareable data and data at said at least one other cache or the second master device;

wherein the first master device is configured to switch to said predetermined coherency mode when processing protected data to be protected from access by at least one other master.

22. The apparatus according to claim 19, wherein the first master device has a predetermined coherency mode in which the first master device ignores incoming snoop transactions and returns a miss indication to the interconnect for said incoming snoop transactions;

wherein the first master device is configured to switch to said predetermined coherency mode when processing protected data to be protected from access by at least one other master.

23. The apparatus according to claim 21, wherein the memory access permission data supports defining a given region of the address space as a read only region for which the first master device is allowed to read data from the given region and is prohibited from writing data to the given region.

24. The apparatus according to claim 20, wherein the filter is configured to permit incoming snoop transactions received from the interconnect to be passed to the first master device independent of the memory access permission data.

25. A data processing method comprising:

intercepting coherency protocol transactions exchanged between a first master device and an interconnect for managing coherency between a first cache comprised by said first master device and at least one other cache or a second master device; and filtering the coherency protocol transactions in dependence on memory access permission data defining which regions of an address space the first master device is allowed to access;

wherein the filtering comprises blocking an outgoing coherency protocol transaction issued from said first master device to said interconnect, when a memory access permission violation is detected for the outgoing coherency protocol transaction in dependence on the memory access permission data;

wherein said memory access permission violation is detected when the outgoing coherency protocol transaction is a read transaction capable of causing data to be stored in said first cache in a shareable modifiable coherency state in which coherency is to be maintained between the data in said first cache and said at least one other cache or the second master device, and the first master device is allowed to modify the data without issuing a further coherency protocol transaction to said interconnect, and the memory access permission data specifies that the first master device is:

prohibited from writing data to a region of the address space including a target address specified by the outgoing coherency protocol transaction; and permitted to read data from said region of the address space including the target address specified by the outgoing coherency protocol transaction.

* * * * *